United States Patent
Dahod et al.

(10) Patent No.: US 6,574,608 B1
(45) Date of Patent: Jun. 3, 2003

(54) WEB-BASED SYSTEM FOR CONNECTING BUYERS AND SELLERS

(75) Inventors: Shabbir M. Dahod, North Andover, MA (US); Robert F. Gurwitz, Newton, MA (US); Andrew Marcuvitz, Lincoln, MA (US); Allen E. Olsen, Lexington, MA (US); Peter J. Spellman, Rockland, MA (US)

(73) Assignee: iWant.com, Inc., Burlington, MA (US)

( * ) Notice: Subject to any disclaimer, the term of this patent is extended or adjusted under 35 U.S.C. 154(b) by 0 days.

(21) Appl. No.: 09/329,972

(22) Filed: Jun. 11, 1999

(51) Int. Cl.[7] .............................. G06F 17/60
(52) U.S. Cl. .................... 705/26; 705/10; 705/20; 705/21; 705/27; 705/34; 705/40
(58) Field of Search ................. 705/26, 27, 10, 705/34, 20, 21, 40

(56) References Cited

U.S. PATENT DOCUMENTS

| | | | |
|---|---|---|---|
| 5,297,032 A | | 3/1994 | Trojan et al. ............... 364/408 |
| 5,692,132 A | * | 11/1997 | Hogan ......................... 395/227 |
| 5,710,884 A | * | 1/1998 | Dedrick ................. 395/200.47 |
| 5,710,887 A | * | 1/1998 | Chelliah et al. ............ 395/226 |
| 5,724,521 A | * | 3/1998 | Dedrick ....................... 395/226 |
| 5,737,619 A | | 4/1998 | Judson ......................... 395/761 |
| 5,774,873 A | | 6/1998 | Berent et al. ................. 705/26 |
| 5,794,207 A | | 8/1998 | Walker et al. ................. 705/23 |
| 5,794,219 A | | 8/1998 | Brown .......................... 705/37 |
| 5,815,551 A | | 9/1998 | Katz ............................. 379/88 |
| 5,825,883 A | * | 10/1998 | Archibald et al. ............ 380/25 |
| 5,875,296 A | | 2/1999 | Shi et al. ................ 395/188.01 |
| 5,909,492 A | * | 6/1999 | Payne et al. .................. 380/24 |

FOREIGN PATENT DOCUMENTS

| | | | |
|---|---|---|---|
| EP | 0828223 | 3/1998 | |
| EP | 0 844577 A2 | * 5/1998 | ........... G06F/17/60 |
| WO | 99/52056 | * 5/1998 | ........... G06F/17/60 |
| WO | 9826363 | 6/1998 | |
| WO | 9834168 | 8/1998 | |
| WO | 9834187 | 8/1998 | |
| WO | 9834189 | 8/1998 | |
| WO | 99/46708 | * 9/1999 | |

OTHER PUBLICATIONS

FastParts Enables Online Anonymous Bartering; Sep. 2, 1996; CMP Media Inc. Electronic Buyer's News, pp 11–13.
Commerce One Refefines Electronic Commerce with World's Largest, Open Business–to–Business Marketplace; Mar. 29, 1999; Business Wire, Inc. Business Wire; pp 3–6.

(List continued on next page.)

*Primary Examiner*—V. Millin
*Assistant Examiner*—Pedro R. Kanof
(74) *Attorney, Agent, or Firm*—Hale and Dorr LLP

(57) ABSTRACT

A Web-based buyer-driven system of commerce efficiently and inexpensively connects buyers and sellers. In general, the system includes a Web site globally accessible by potential buyers and sellers. Potential buyers post descriptions of products and services they desire on the Web site. Interested sellers of those products and services can access the descriptions posted by the buyers and selectively post responses to buyers. The responses preferably include information identifying the seller and describing the product or service offered by the seller. The system determines if the potential buyer retrieves a response directed to him from a potential seller and, if so, it charges that potential seller a small fee.

73 Claims, 13 Drawing Sheets

OTHER PUBLICATIONS

Commerce One Announces Initial Public Offering; Jul. 1, 1999; Business Wire, Inc. Business Wire; pp 8–9.

Respond.com Finds Favorite Videos: Seller Helps Movie Enthusiasts Find Thousands of Classic Movies, Business Wire, The Gale Group, Dec. 3, 1999.*

Respond.com; Shopping by request; How it Works; Sellers; form Internet, 3 pages, Aug. 16, 2000.*

Marketsite.net; home page, Introduction, . . . FAQs; from Internet; 8 pages, Aug. 16, 2000.*

Evans, Jim; FastParts Enables Online Anonymous Bartering; Electronic Buyers News; p88, Sep. 2, 1996.*

Commerce One Announces Intitial Public Offering; Business Wire; The Gale Group, Jul. 1, 1999.*

Commerce One Redefines Electronic Commerce with World's Largest, Open Business–to–Business Marketplace; Business Wire; The Gale Group, Mar. 29, 1999.*

* cited by examiner

Pick a Handle

[Back] [Home] [Next]

WebEnvoy lets buyers post listings of what they want for free. We promise not to reveal your contact information to sellers unless you tell us to. You remain anonymous and the sellers come to you. If you decide to buy from the seller, you can reveal only the contact information you want.

First, you need to pick a handle to identify you on the system. Your login, listings, and subsequent communication with sellers is done through the handle.

Confidential information under your control is highlighted in red.

Make up a username:
--*you can use mixed case*
Make up a password:
--*keep this private!*
Enter password again:
--*for verification*
Enter e-mail address:
--*if you have one*

Enter   Reset

© 1999 WebEnvoy, Inc.  All Rights Reserved.

New Buyer Info

[Home]

You can optionally enter your contact information. Remember, we promise not to reveal any contact information to sellers unless you tell us.

Confidential information under your control is highlighted in red.

Name
Street address
Address (cont.)
City
State/Province
Zip/Postal code
Country
Work Phone
Home Phone
FAX Enter   Reset        Da rules © 1999 WebEnvoy, Inc. All Rights Reserved.

New Buyer Profile

Home

You can optionally enter more information about yourself to help sellers better respond to your wants. Remember, we promise not to reveal any profile information to sellers unless you tell us.

Confidential information under your control is highlighted in red.

```
           Age   None Under 20 20-29 30-39 40-49 50-59 60-69 Over 70
Marital Status   None Single Married Divorced Widowed
           Sex   None Male Female
Own/Rent Home    None Own Rent
   Family Size   None 1 2 3 4 5 Over 5
```

Enter        I also want to be a seller        Reset

Da rules

© 1999 WebEnvoy, Inc. All Rights Reserved.

220

FIG. 5 iWant

Home

Member Login:     iWant connects buyers and sellers of goods and services.

User [        ]     If you are buying sellers will beat a path to your door.

Password [        ]     If you are selling find qualified buyers.

Enter    Reset

If you want to look around enter what you want or browse categories:

I want [        ] Now!

Categories

- Home Services
  - Painters
  - Plumbers
  - Carpenters
  - Cleaners
  - Landscapers
  - Exterminators
  - Decorators
  - Architects
  - Electricians
  - Builders
  - Contractors
  - Movers
  - Misc

- Home Professional Services
  - Accountants
  - Tax Prep
  - Personal Lawyers
  - Insurance
  - Investment & Financial Planners
  - Home Banking

- Business Services
  - Corporate Lawyers
  - Accountants
  - Bookkeepers
  - Payroll

- Vehicles
  - Cars
  - Used Cars
  - Trucks
  - Vans
  - SUVs
  - Boats
  - Airplanes

- Real Estate
  - Real Estate Agent:
  - Mortgage Brokers
  - Houses to buy
  - Houses to rent
  - Condominiums and Coops
  - Apartments to rent
  - Misc

- Travel & Entertainment
  - Travel Agents
  - Vacation packages
  - Airline tickets
  - Vacation homes to rent
  - Event/theater ticket
  - Restaurants
  - Health Clubs

FIG. 7 iWant

| | Buyer | Rep | Subject |
|---|---|---|---|
| 252 | alexis | 5 254 | Horseback riding camp 256 |

| Post Date | Exp Date | Response |
|---|---|---|
| 2/2/99 258 | 3/2/99 260 | 0 262 |

Listing

Home

Find
Want
Sell
Logout

266 — Personal Info: 14yrs, Female, Lincoln, MA and Newport, RI

I'm interested in a horseback riding camp. It has to be in the USA though. In this camp I want to be able to ride twice a day with optional private lessons. The camp has to be able to teach advanced riders and there must be jumping. Each rider should have her own horse to ride and take care of. Swimming and other water sports can be optional for this camp.

264

Respond Now!   Respond Later   Not interested

© 1999 WebEnvoy, Inc. All Rights Reserved.

FIG. 8

New Seller Info

Home | Next

To respond to buyer listings you must create a profile.

WebEnvoy lets sellers find qualified buyers for their products or services. You enter some profile information and are matched with buyers who fit your business category. You browse their listings and respond to the buyers you want, sending promotions, proposals, or other direct marketing materials. You pay us based on the number of listings you respond to and how you wish to communicate with the leads. You can respond individually, to a group, or do a mass response to a category. Once you respond to a listing, the buyer can decide to contact you individually and converse anonymously through the system, revealing contact info when he or she decides.

*Name* — 272
*Title*
*Organization*
*Street address*
*Address (cont.)*
*City*
*State/Province*
*Zip/Postal code* — 274
*Country*
*Work Phone*
*FAX*
*E-mail*
*URL*

BILLING — 276

*Credit card*  VISA MasterCard American Express Diner's Club Discover
*Cardholder name*
*Card number*
*Expiration date*

Enter    Reset

Da rules

WEB-BASED SYSTEM FOR CONNECTING BUYERS AND SELLERS

FIELD OF THE INVENTION

The present invention relates generally to electronic commerce systems and, more particularly, to a Web-based system for facilitating transactions between buyers and sellers.

BACKGROUND OF THE INVENTION

Retail sales of goods and services are typically made using traditional direct or mass marketing schemes in which a seller advertises products and services to a large audience with the hope of making sales to a small number of buyers in the audience. These schemes are seller-driven in the sense that the seller controls the process of pairing buyers with the seller. For instance, the seller sets a price and decides how and where to advertise. The buyer studies the advertising he receives and decides whether or not to make a purchase. This type of marketing scheme is generally a costly and inefficient way of bringing about a transaction between buyers and sellers since typically only a very small percentage of the audience responds to the mass advertising.

When a buyer is in the market for a particular product or service, effort is typically required on his or her part to find a suitable seller of the desired product or service. For example, an individual seeking television repair services might search through available advertising material to identify television repair shops and then contact the shops to find one that can do the work required at the lowest cost. Because of the effort involved, the buyer is ordinarily deterred from contacting a large number of television repair shops since at some point the benefits from doing so (e.g., finding the best price for the desired work) would be outweighed by the amount of time and money expended in the search effort. Consequently, purchase decisions are ordinarily made after contacting very few sellers.

A buyer-driven system of commerce is a less traditional system in which the buyer advertises his needs and invites responses from sellers (e.g., a "wanted to buy" classified advertisement). Buyer-driven systems have certain advantages over seller-driven systems. In particular, a buyer-driven system allows buyers to more easily reach a large number of sellers, many of who might not have the resources to advertise extensively.

Traditional buyer-driven systems however have certain drawbacks. For instance, buyers often end up being inundated with too many offers from potential sellers, many of whom may be unqualified. Also, the buyer typically has to reveal a telephone number or other personal contact information in order to allow sellers to quickly and easily reach him. Consequently, buyers may end up receiving many intrusive and unwanted telephone calls from sellers. In addition, in traditional buyer-driven systems, buyers bear the cost of advertising their needs (e.g., the cost of classified advertisements), which reduces the use of such systems.

A need exists for an improved buyer-driven system of commerce not having the drawbacks described above. In particular, a need exists for a buyer-driven system that allows buyers to be connected with qualified sellers easily, efficiently and inexpensively.

Another aspect of buyer-driven commerce systems is qualification of the buyer as a ripe lead or prospect. In traditional seller-driven systems, the seller attempts to initially qualify buyers through very broad means, such as by using demographic information to target direct mail campaigns. In brokered commerce, such as real estate or securities sales, a broker serves as a qualifying agent for both the buyer and the seller. However, brokers are only available in those market segments where the transaction value is high enough to support the use of a third party, who typically is compensated through a fee based on the transaction value. Clearly, a buyer-driven commerce system that facilitates the qualification of buyers in the way a broker might would be advantageous in market segments that might not typically support brokers.

BRIEF SUMMARY OF THE INVENTION

One object of the present invention is to provide a buyer-driven system for inexpensively and efficiently connecting buyers of particular products or services with sellers of such products or services.

Another object of the invention is to provide a buyer-driven system for connecting buyers and sellers that inhibits responses from unqualified sellers.

Another object of the invention is to provide a buyer-driven system for connecting buyers and sellers that efficiently allows buyers to qualify themselves to sellers and allows sellers to efficiently find qualified buyers.

A further object of the invention is to provide a buyer-driven system of commerce that enables buyers to control whether and how personal information on the buyer is revealed to a given seller.

These and other objects are achieved by an inventive Web-based buyer-driven system that efficiently and inexpensively connects buyers and sellers. In general, the system includes a Web site globally accessible by potential buyers and sellers. Potential buyers post descriptions of products and services they desire on the Web site, along with any personal information (typically other than contact information) that may better qualify their wants to the sellers. Interested sellers of those products and services can access the descriptions posted by the buyers and selectively post responses to buyers. The responses preferably include information identifying the seller and describing the product or service offered by the seller. The system determines if the potential buyer retrieves a response directed to him from a potential seller and, if so, it charges that potential seller a small fee.

One advantage of the inventive system is that it allows buyers to find qualified sellers with little effort and at no cost.

Another advantage of the invention is that it allows sellers to efficiently identify qualified buyers without use of costly mass marketing schemes.

Yet another advantage of the system is that it gives the buyer control over whether and how personal information is revealed to sellers. In particular, the system allows buyer listings to be posted anonymously, and the buyer can progressively reveal personal information such as demographic information or contact information to any given seller as desired.

An additional advantage of the inventive system is that it keeps the buyer from being inundated with large numbers of unwanted offers from unqualified sellers due to the economic barrier imposed by the fee charged the seller for his response to the buyer.

A further advantage is that buyer listings are globally accessible to all potential sellers and not limited to a few selected sellers.

Another advantage of the system is that once the seller has been charged with a fee, buyers and sellers are free to communicate within or outside of the system as they choose. For example, the buyer may decide not to reveal contact information to the seller and instead communicate within the system, maintaining anonymity. At the point where the buyer decides to proceed further with the transaction, the buyer can reveal contact information to the seller and the transaction can proceed outside the system.

Another advantage of the system is that the buyer may decide to block further communication with the seller prior to revealing contact information.

These and other objects and advantages of the present invention will become readily apparent from the following detailed description wherein embodiments of the invention are shown and described by way of illustration of the best mode of the invention. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated in the claims.

BRIEF DESCRIPTION OF THE DRAWINGS

For a fuller understanding of the nature and objects of the present invention, reference should be made to the following detailed description taken in connection with the accompanying drawings wherein:

FIG. 3 is a screen shot of a sample buyer handle registration form in accordance with the invention;

FIG. 4 is a screen shot of a sample buyer contact information form in accordance with the invention;

FIG. 5 is a screen shot of a sample buyer profile form in accordance with the invention;

FIG. 7 is a screen shot of a sample Web site home page in accordance with the invention;

FIG. 8 is a screen shot of a posted sample buyer listing in accordance with the invention;

FIG. 9 is a screen shot of a sample seller registration form in accordance with the invention;

FIG. 12 is a screen shot of a sample brief description of a seller response.

DETAILED DESCRIPTION OF THE PREFERRED EMBODIMENTS

Figure 1:
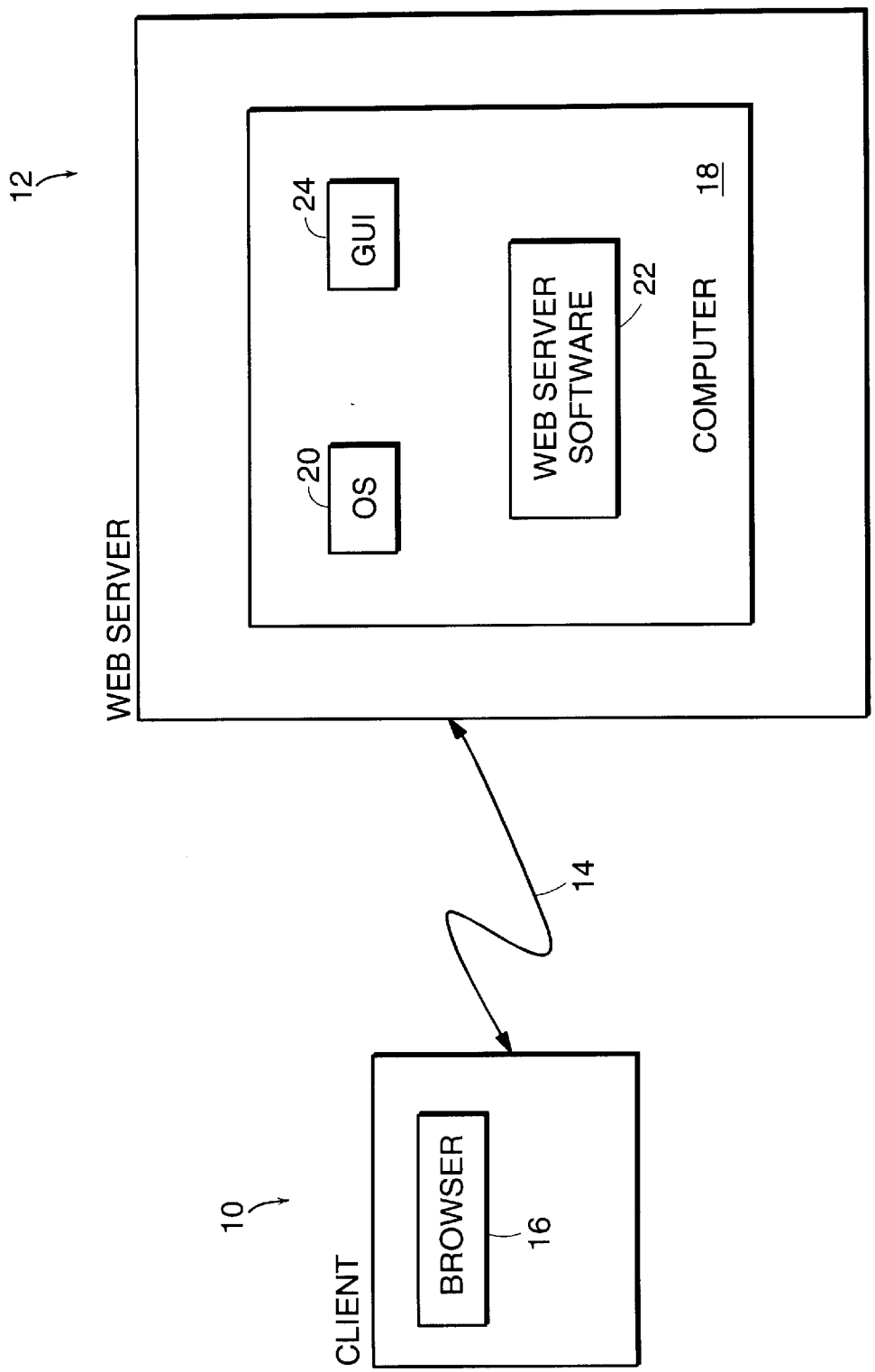
FIG. 1 is a schematic illustration of a representative network in which the inventive system is preferably implemented.

FIG. 1 illustrates a representative network in which the present invention is preferably implemented. The network includes a client machine 10 connected to a Web server 12 via a communication channel 14. The channel 14 is preferably the Internet. It may, however, alternatively comprise an Intranet or other known connection. In the case of the Internet, the Web server 12 is one of a plurality of servers that are accessible by a plurality of clients such as the client machine 10.

By way of example, the client machine 10 is a personal computer such as a Pentium-based desktop or notebook computer running a Windows operating system. The client machine 10 includes a browser 16, a known software tool used to access the servers of the network. Representative browsers include, among others, Netscape Navigator and Microsoft Internet Explorer. Client machines usually access servers through some private Internet access provider or an on-line service provider (such as, e.g., America Online).

By way of example, the Web Server 12 comprises an IBM RISC System/6000 computer 18 running the AIX (Advanced Interactive Executive Version 4.1 and above) Operating System 20 and a Web server program 22 (such as Netscape Enterprise Version 2.0) that supports interface extensions. (Various other suitable hardware/operating system/web server program combinations are possible.) The server 12 also includes a graphical user interface (GUI) 24 for management and administration.

The Web server 12 operates a so-called "Web site" and supports files in the form of documents and pages. A network path to a Web site generated by the server is identified by a so-called Uniform Resource Locator (URL).

The World Wide Web is the Internet's multimedia information retrieval system. In particular, it is a collection of servers of the Internet that use the Hypertext Transfer Protocol (HTTP), which provides users access to files (which can be in different formats such as text, graphics, images, sound, video, etc.) using a standard page description language known as Hypertext Markup Language (HTML). HTML provides basic document formatting and allows developers to specify links to other servers and files. These links include "hyperlinks," which are text phrases or graphic objects that conceal the address of a site on the Web.

A user of a client machine having an HTML-compatible browser (e.g., Netscape Navigator) can retrieve a Web page (namely, an HTML formatted document) of a Web site by specifying a link via the URL. Upon such specification, the client machine makes a transmission control protocol/Internet protocol (TCP/IP) request to the server identified in the link and receives the Web page in return.

The present invention is a system of commerce preferably implemented in the Internet environment. Specifically, the invention is a Web-based buyer-driven system for efficiently and inexpensively connecting buyers and sellers. In general, the system includes a Web site accessible by potential buyers and sellers. Buyers post on the Web site descriptions of products and services they desire, typically along with some personal information such as demographic information that might serve to qualify them to potential sellers. Interested sellers of those products and services can, for a small fee, communicate with buyers they have selected. The system allows buyers to find qualified sellers with little effort and at no cost, and it allows sellers to easily find qualified buyers without using costly mass marketing. The fee paid by the seller to communicate with the buyer acts as a barrier to unwanted communication from the buyer's point of view, thereby inhibiting responses from unqualified sellers or "junk mail".

As used herein, the terms "buyer" and "seller" are intended to broadly encompass individuals as well as groups, organizations, corporate entities and the like.

The system Web site is generated by a Web server (such as server 12). The Web site is preferably globally accessible via the Internet to potential buyers and sellers using individual client machines (such as personal computers 10).

Figure 2:
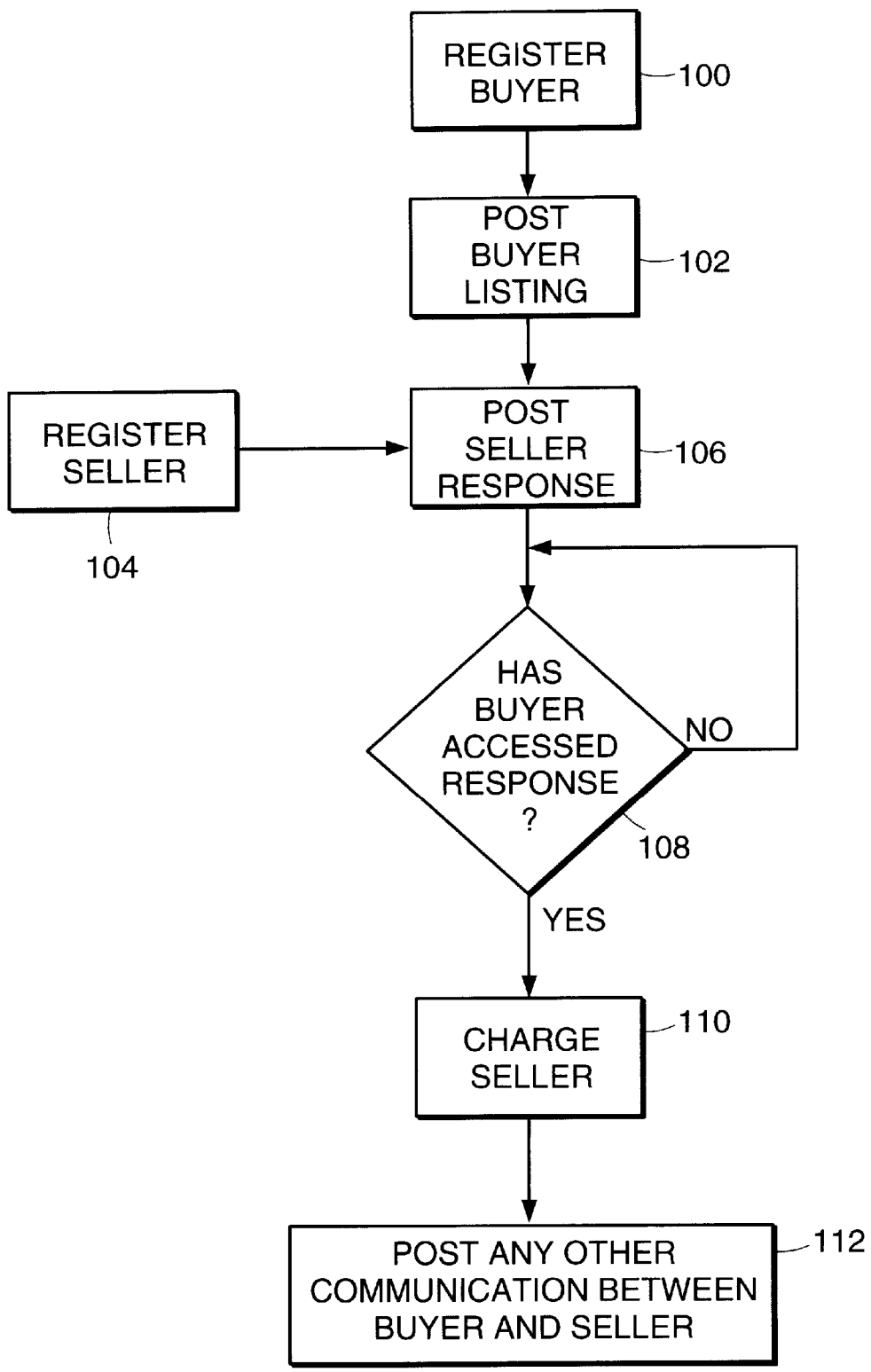
FIG. 2 is a flow chart illustrating the process of connecting buyers and sellers in accordance with the invention.

FIG. 2 is a simplified flow chart illustrating the inventive process of connecting buyers and sellers.

The buyer initially registers with the system at step 100. Thereafter, as will be described, the buyer can post a listing on the Web site describing the product or service desired and, later, retrieve any responses from sellers. Registration involves accessing the Web site and inputting a username and password in a buyer registration form displayed as a Web page on the buyer's client machine 10. A screen shot of a sample buyer registration form 200 is shown in FIG. 3. As shown, the form has fields associated with username and password for the buyer to fill in. The system preferably allows the username entered by the buyer to be fictional to protect anonymity. The information entered by the user is transmitted from the client machine 10 to the Web server 12 and stored in a system database. The information is used to provide the buyer with secured access to responses posted by sellers as will be described below.

The buyer is then preferably given the option to register other information such as an actual name and contact information (e.g., an address and telephone number). This information can be entered on a subsequent Web page form 210 (a sample screen shot of which is shown in FIG. 4) displayed by the system after the user has completed form 200. As will be discussed below, this information is not revealed to sellers (or others) without a request by the buyer to do so in order to protect buyer confidentiality.

The system preferably generates a subsequent Web page 220 (shown in FIG. 5), giving the buyer the option to enter buyer profile information. This includes information, e.g., on the buyer's age, marital status, gender, family size and whether he or she owns or rents housing. This information is also preferably kept confidential unless the buyer consents to it being revealed.

Figure 6:
FIG. 6 is a screen shot of a sample buyer listing form in accordance with the invention.

Next at step 102, the buyer posts a listing describing the goods or services desired. A screen shot of a sample Web page form 230 on which this information can be entered is shown in FIG. 6. The information entered will preferably include a description 232 of the goods or services desired and a short subject heading 234. The system will preferably automatically select a category (and any sub-category) under which the posting will be indexed based on particular words appearing in the subject heading. The buyer can, however, select an alternate category if desired or choose a category if the system is unable to identify one.

If the buyer clicks on button 236, the system will automatically insert into field 238 certain profile information filled in by the buyer in form 220 of FIG. 5 as well as general geographic information from form 210 of FIG. 4. Preferably no specific contact information or identity information from form 210 is entered.

Each buyer listing is filed in the selected category, a list of which appears on the home page of the Web site. FIG. 7 illustrates a screen shot of a sample home page 240. The home page 240 lists various categories, each preferably being hyperlinked to a Web page for the category containing the buyer listings filed thereunder.

FIG. 8 illustrates a sample buyer listing 250 generated by the system. Each buyer listing will preferably contain the following information: a buyer username 252, a "buyer reputation" value 254 (described below), the short subject heading 256, the date of posting 258, an expiration date 260, the number of seller responses received to date 262, and a description of the goods or services wanted 264. Any information entered in field 238 of FIG. 6 appears at 266. The expiration date 260 is automatically selected by the system based on a preset time period after the posting date 258. Alternatively, it may be chosen by the buyer. When a listing expires, the system preferably removes it from the Web site.

The buyer reputation information 254 is represented by some value, e.g., a numerical value. This value indicates historically the number of times the buyer has revealed his or her identity to any seller (as will be described below). This gives the potential seller some information as to the credibility or seriousness of the buyer and allows the seller to make a more informed choice on whether to pay for contacting the buyer.

Figure 10:
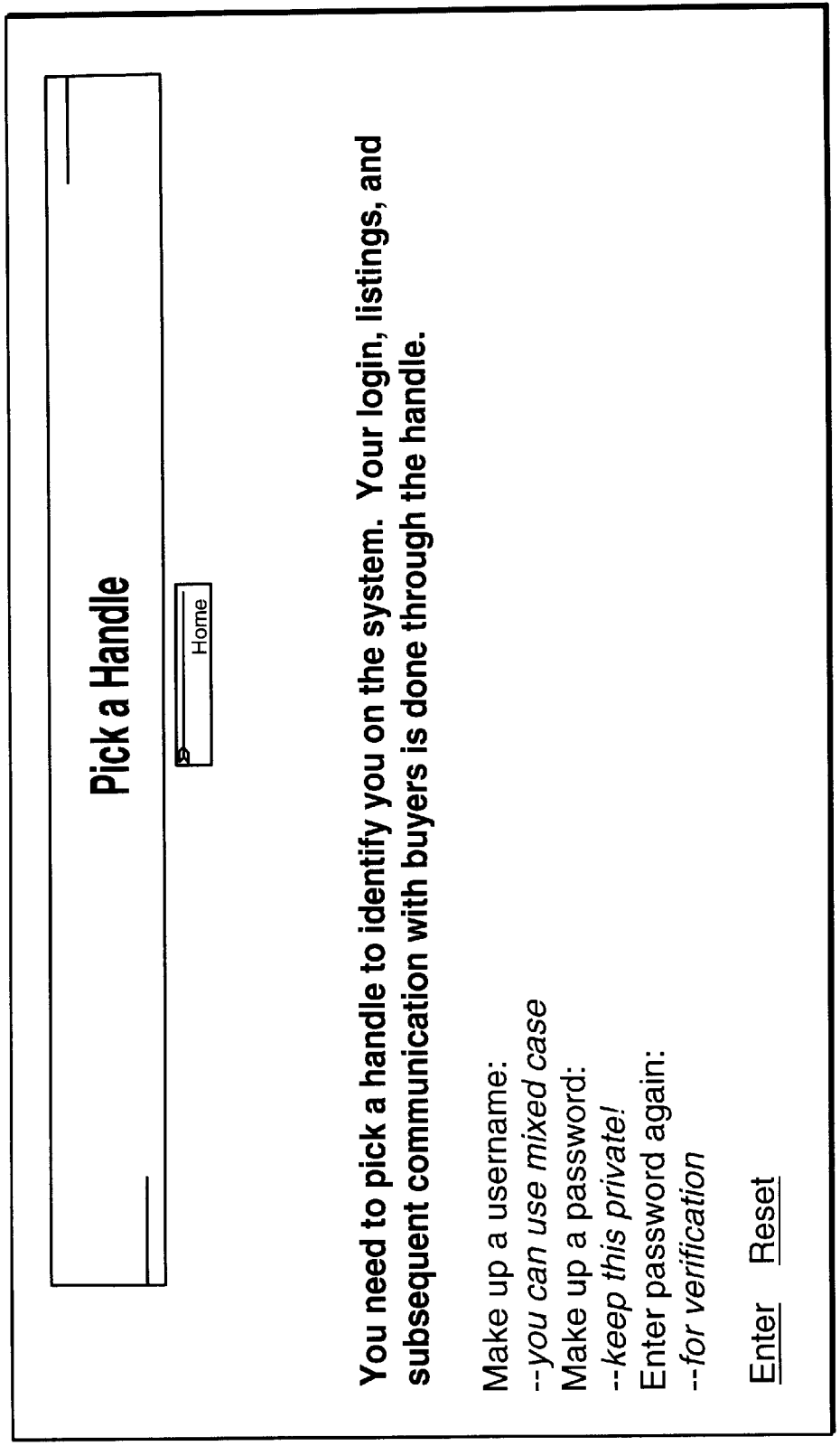
FIG. 10 is a screen shot of a sample seller handle registration form in accordance with the invention.

Potential sellers can study the posted buyer listings and decide on whether or not to respond to any listing. A seller interested in responding to a listing must preferably first register with the system at step 104. FIG. 9 is a screen shot of a sample seller registration form 270 on the Web site. Registration involves providing certain information such as the seller's identity 272, contact information (e.g., an email address) 274, and how he or she will be billed (e.g., credit card information) 276. Sellers also select a username and password on a subsequently generated Web page (sample form 280 shown in FIG. 10) for secured access to their accounts and to responses directed to them from buyers.

Sellers can browse through buyer listings to find potential buyers of their products or services. Sellers can look for potential buyers in selected categories and geographic locations or perform a text search of all listings.

Figure 11:
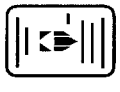
FIG. 11 is a screen shot of a sample seller response in accordance with the invention.

If the seller is interested in making a sale to the buyer, the seller posts a response at step 106 to the buyer describing the products or services offered. FIG. 11 is a screen shot illustrating a sample seller response 280. This response is preferably accessible only by the buyer to whom it is directed. The seller response 280 includes information on the seller (e.g., his identity) 282 and a description of the goods or services offered 284. The response can also include pre-formatted HTML promotional materials 286 and a hyperlink 288 to a Web site that the seller may have.

Figure 12:
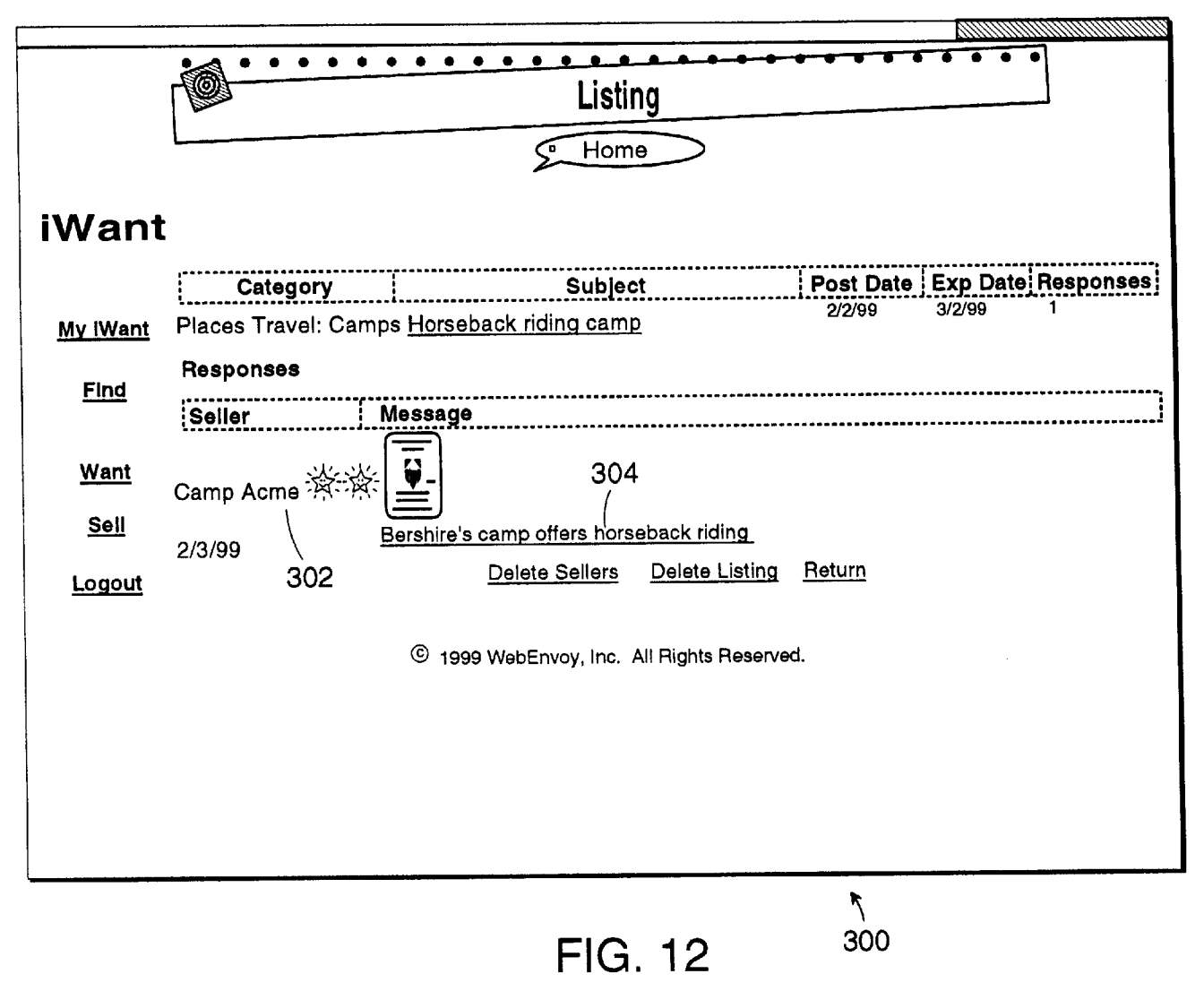

The buyer's access to seller responses will be on two levels. The buyer will initially be able to view only a relatively brief description of the seller's response to his or her listing (the first level of seller information). FIG. 12 is a screen shot illustrating a sample description of a seller response 300. The brief description will preferably include the seller's identity 302 and some information on the goods or services offered 304. The buyer is thereby able to decide at step 108 (FIG. 2) whether or not he or she has sufficient interest to view the complete response posted by the seller (i.e., the second level of seller information shown. e.g., in FIG. 11).

If the buyer accesses or retrieves the response (the second level of information) 280, the seller is billed a small fee (e.g., $5) at step 110. (The seller is not charged if the buyer does not access the seller's response.) The seller is billed regardless of whether a sale is eventually made. Once the seller has been charged for the initial response to the buyer's listing, the buyer and seller may continue to communicate with each other through the system (at step 112) preferably without incurring any additional charges.

By charging sellers a small fee when their responses are viewed by buyers, the system will keep buyers from being inundated with an overly large number of responses from marginal or unqualified sellers. Such sellers will be deterred from posting a response since they will weigh their chances of making a sale (which will be low if they are unqualified) with the cost of posting a response. Yet the cost will be sufficiently low not to deter qualified sellers from using the system. The fee acts as an economic barrier to unwanted communication from seller to buyer. Note that while the barrier may preferably be a monetary fee, it may also be some other economic, such as a credits system.

If the buyer is interested in what the seller offers, he or she may further communicate with the seller through the system without revealing his or her identity (if desired) by posting additional messages to that seller. (These messages will only be accessible by the seller to whom it is directed.) Alternatively, the buyer may reveal his or her identity and contact information and can communicate directly with the seller outside the system (e.g.,.by telephone). The system will insert previously stored contact information of the buyer (i.e., the information entered in FIG. 4) in a posting directed to a seller when requested by the buyer. Whenever a buyer reveals his identity In this manner, the system increases his or her reputation value 254 by one. An advantage of the system is that the buyer can progressively reveal information about himself or herself as he or she becomes comfortable in dealing with a particular seller. The buyer can also at any time block all further communication through the system with a particular seller by making a request to the system that a particular seller not be allowed to post any further messages to the buyer.

Figure 13:
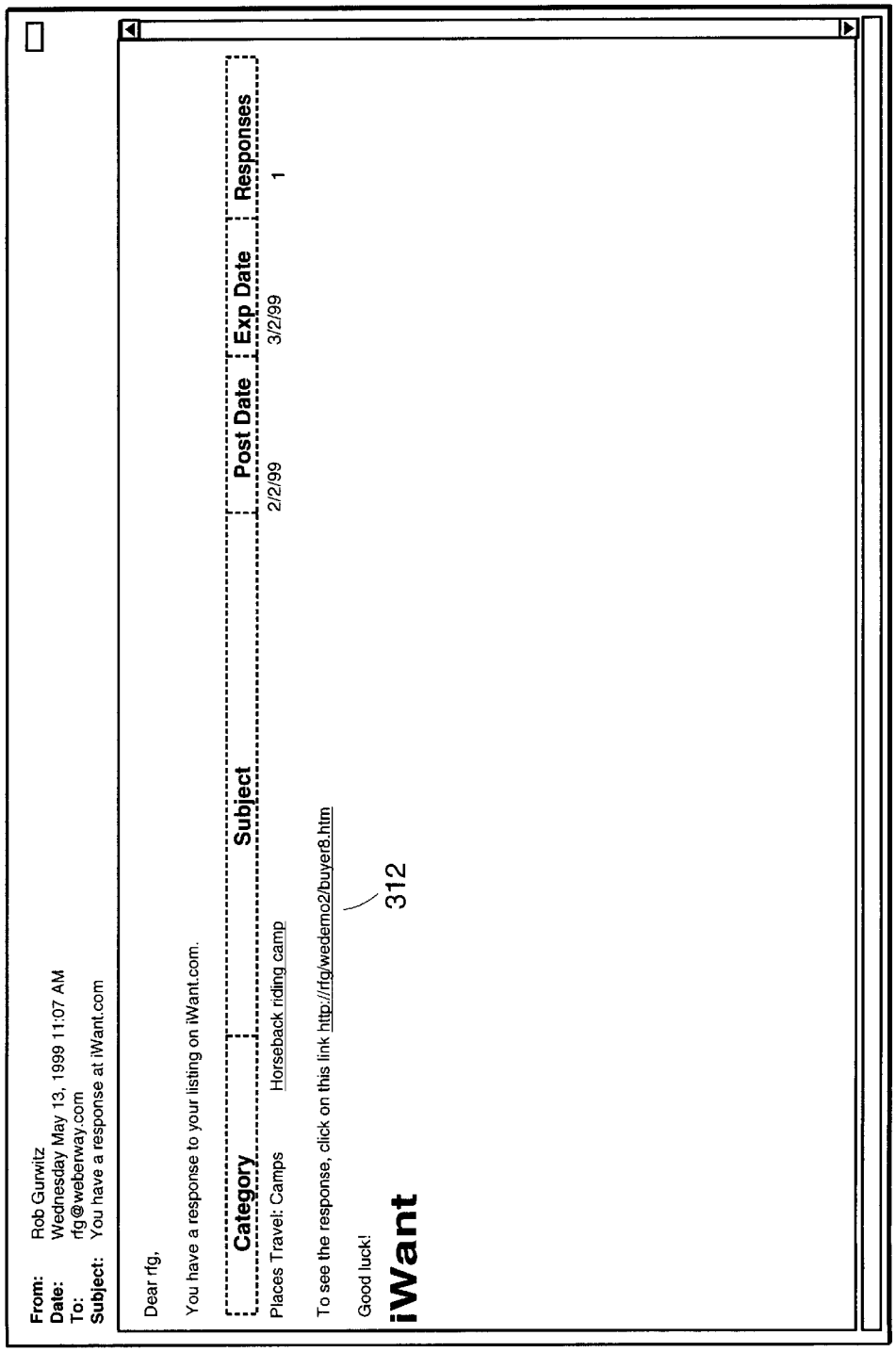
FIG. 13 is a screen shot of a sample email from system to indicate account activity in accordance with the invention.

Buyers and sellers can periodically access the Web site to check for any responses posted to buyer's listings or seller's responses to listings. In addition, whenever a new posting has been made, the system preferably automatically sends an email (if an email address is provided) to the buyer or seller indicating activity. FIG. 13 is a screen shot of a sample email message 310 sent by the system to indicate activity in the buyer account. For convenience, the email received by the buyer or seller will include a direct hyperlink 312 to the system Web page where the particular listing or response is posted.

Having described embodiments of the present invention, it should be apparent that modifications can be made without departing from the scope of the present invention.

What is claimed is:

1. A method of connecting a potential buyer of a product or service with a potential seller of a product or service, comprising:

receiving from the potential buyer a description of a product or service desired;

making said description available to a plurality of potential sellers;

receiving a response from at least one of said potential sellers interested in making a sale to said potential buyer;

making said response accessible to said potential buyer; and if said potential buyer accesses said response, charging said at least one potential seller a fee.

2. The method of claim 1 further comprising registering said potential buyer.

3. The method of claim 2 wherein registering said potential buyer comprises receiving from said potential buyer username and password information for use in restricting access to said response.

4. The method of claim 1 wherein said step of making said description available to a plurality of potential sellers comprises posting said description on an Internet Web site.

5. The method of claim 1 further comprising identifying a category for said description and filing said description in the identified category.

6. The method of claim 1 further comprising inhibiting persons other than said potential buyer from accessing said response.

7. The method of claim 1 wherein said method is implemented in a Web server linked to a plurality of client machines associated with said potential buyer and potential sellers.

8. The method of claim 7 wherein said client machines comprise personal computers.

9. The method of claim 7 wherein said Web server is linked to said client machines through Internet connections.

10. The method of claim 1 further comprising receiving from said potential buyer information relating to said potential buyer.

11. The method of claim 10 wherein said information comprises contact information.

12. The method of claim 10 wherein said information comprises buyer profile information.

13. The method of claim 10 further comprising making said information relating to said potential buyer available to said at least one potential seller upon request from said potential buyer.

14. The method of claim 1 further comprising registering said at least one potential seller prior to making said response accessible to said potential buyer.

15. The method of claim 1 further comprising receiving payment information from said at least one potential seller.

16. The method of claim 15 wherein said payment information includes a credit card number of said at least one potential seller.

17. The method of claim 1 further comprising providing to said potential buyer information relating to said response to enable said potential buyer to make an informed decision as to whether to access said response.

18. The method of claim 17 wherein said information comprises a brief description of the product or service offered by said at least one potential seller.

19. The method of claim 17 wherein said information includes the identity of the said at least one potential seller.

20. The method of claim I further comprising sending a notification to a selected potential seller that said description is available after receiving said description from the potential buyer.

21. The method of claim 20 wherein said selected potential seller is a potential seller previously identified as having interest in receiving said notification.

22. The method of claim 21 wherein said selected potential seller previously requested receiving said notification.

23. The method of claim 20 wherein sending a notification to the selected potential seller comprises sending said selected potential seller an email.

24. The method of claim 23 wherein said step of making said description available to a plurality of sellers comprises posting said description on a Web site, and wherein said email includes a hyperlink to the Web site.

25. The method of claim 1 further comprising facilitating communication between the potential buyer and said at least one potential seller after said seller has been charged a fee.

26. The method of claim 25 further comprising blocking communication between the potential buyer and said at least one potential seller upon request.

27. The method of claim 25 wherein facilitating communication comprises posting messages on an Internet Web site from said potential buyer and said at least one potential seller to each other.

28. The method of claim 1 further comprising making a reputation value of said potential buyer available to said plurality of potential sellers.

29. The method of claim 28 wherein said reputation value comprises the number of times said potential buyer has previously revealed his or her identity to a potential seller.

30. The method of claim 1 wherein said response includes a description of the product or service offered by the said at least one potential seller.

31. The method of claim 1 wherein making said response accessible comprises posting said response on a Web site.

32. The method of claim 31 wherein said response includes pre-formatted HTML promotional materials.

33. The method of claim 31 wherein said response includes a hyperlink to a Web site associated with said at least one potential seller.

34. The method of claim 1 wherein said potential buyer remains anonymous to said potential sellers as long as said potential buyer desires.

35. The method of claim 1 wherein said fee inhibits responses from unqualified potential sellers.

36. A method of using a computer to facilitate a transaction between a buyer and a seller, comprising:
   inputting into the computer a description received from a potential buyer of a desired product or service;
   outputting the description to a plurality of sellers; inputting into the computer a response from at least one of the sellers interested in making a sale to the buyer;
   outputting said response to said buyer;
   determining if said buyer has viewed said response and, if so, charging said at least one seller a fee.

37. The method of claim 33 wherein said computer comprises a Web server.

38. The method of claim 34 wherein said step of outputting the description comprises posting said description on a Web site generated by said Web server.

39. The method of claim 34 wherein said step of outputting said response to said buyer comprises posting said response on a Web page generated by the Web server accessible by said buyer.

40. A computer for facilitating a transaction between a buyer and a seller, comprising:
   a storage device storing a program; and
   a processor operative with the program to:
      (a) receive from the buyer a description of a desired product or service;
      (b) make the description available to a plurality of sellers;
      (c) receive a response from at least one of the sellers interested in making a sale to the buyer;
      (d) make the response accessible to the buyer; and
      (e) charge the at least one seller a fee if the buyer accesses the response.

41. The method of claim 40 wherein said computer comprises a Web server.

42. A Web-based system of connecting a potential buyer of a product or service with a potential seller, comprising:
   means for receiving from the potential buyer a description of a product or service desired;
   means for making said description available to a plurality of potential sellers;
   means for receiving a response from at least one of said potential sellers interested making a sale to said potential buyer;
   means for making said response accessible to said potential buyer; and
   means for charging said at least one potential seller a fee if said potential buyer accesses said response.

43. A method of connecting a potential buyer of a product or service with a potential seller, comprising:
   receiving from a plurality of potential buyers descriptions of a products or services desired;
   posting said descriptions on an Internet Web site accessible by a plurality of potential sellers;
   receiving a response from at least one of said potential sellers interested in making a sale to a selected one of said potential buyers;
   posting said response on an Internet Web site accessible to said selected one of potential buyers; and
   determining if said selected one of said potential buyers retrieves said response and, if so, charging said at least one potential seller a fee.

44. The method of claim 43 further comprising registering each of said potential buyers.

45. The method of claim 44 wherein registering said potential buyers comprises receiving from each of said potential buyers username and password information for use in restricting access to responses posted for said buyers.

46. The method of claim 43 further comprising identifying categories for said descriptions and filing each said description in an identified category.

47. The method of claim 43 further comprising inhibiting persons other than said selected one of said potential buyers from accessing said response.

48. The method of claim 43 further comprising receiving from said potential buyers information relating to said potential buyers.

49. The method of claim 48 wherein said information comprises contact information.

50. The method of claim 48 wherein said information comprises buyer profile information.

51. The method of claim 48 further comprising making information relating to a given buyer available to a potential seller upon request from said given buyer.

52. The method of claim 43 further comprising registering said at least one potential seller prior to making said response accessible to said potential buyer.

53. The method of claim 43 further comprising receiving payment information from said at least one potential seller.

54. The method of claim 53 wherein said payment information includes a credit card number.

55. The method of claim 43 further comprising providing to said selected one of said potential buyers information relating to said response to enable said selected one of said potential buyers to make an informed decision as to whether to access said response.

56. The method of claim 55 wherein said information comprises a brief description of the product or service offered by said at least one potential seller.

57. The method of claim 55 wherein said information includes the identity of the said at least one potential seller.

58. The method of claim 43 further comprising sending a notification to a selected potential seller that said description is available.

59. The method of claim 58 wherein said selected potential seller is a potential seller previously identified as having interest in receiving said notification.

60. The method of claim 59 wherein said selected potential seller previously requested receiving said notification.

61. The method of claim 58 wherein sending a notification to the selected potential seller comprises sending said selected potential seller an email.

62. The method of claim 61 wherein said email includes a hyperlink to the Web site.

63. The method of claim 43 wherein said potential buyers remain anonymous to said potential sellers as long as said potential buyers desire.

64. The method of claim 43 wherein said fee inhibits responses from unqualified potential sellers.

65. The method of claim 1 further comprising storing said description in a searchable database indexed by category and keywords; and receiving from a potential seller a category and/or keyword for a product or service as criteria to search the searchable database; and wherein making said description available comprises making descriptions that match the criteria available to the potential seller.

66. The method of claim 1 wherein making said description available comprises posting said description in a searchable database or catalog on an Internet Web site.

67. The method of claim 66 further comprising allowing potential sellers to search the database of buyer descriptions by category or keyword.

68. The method of claim 67 further comprising allowing potential sellers to view said description to enable a potential seller to make an informed decision as to whether to respond.

69. The method of claim 24 wherein posting said description comprises posting said description in a searchable database or catalog on the Web site.

70. The method of claim 36 further comprising:

storing said description received from a potential buyer in a searchable database or catalog;

inputting into the computer a category and/or keywords received from a potential seller of a product or service as criteria to search the database;

and wherein outputting the description comprises outputting a description that matches the criteria.

71. The computer of claim 40 wherein (a) further includes store the description in a searchable database or catalog and wherein (b) comprises receive from the seller a category and/or keyword describing a product or service to be used as criteria for searching the database or catalog and make descriptions that match the criteria available to the seller.

72. The Web-based system of claim 42 wherein the means for receiving comprise means for receiving a description and storing the description in a searchable database or catalog; and wherein means for making descriptions available comprise means for receiving from the potential seller a category and/or keyword describing a product or service used as criteria for searching the database or catalog and means for making descriptions matching the criteria available.

73. The method of claim 43 wherein posting said descriptions comprises posting said descriptions in a searchable database or catalog; and further comprising receiving from the potential seller a category and/or keyword describing a product or service as criteria for searching the database or catalog and making descriptions matching said criteria available to the seller.

* * * * *